Patented Nov. 27, 1945

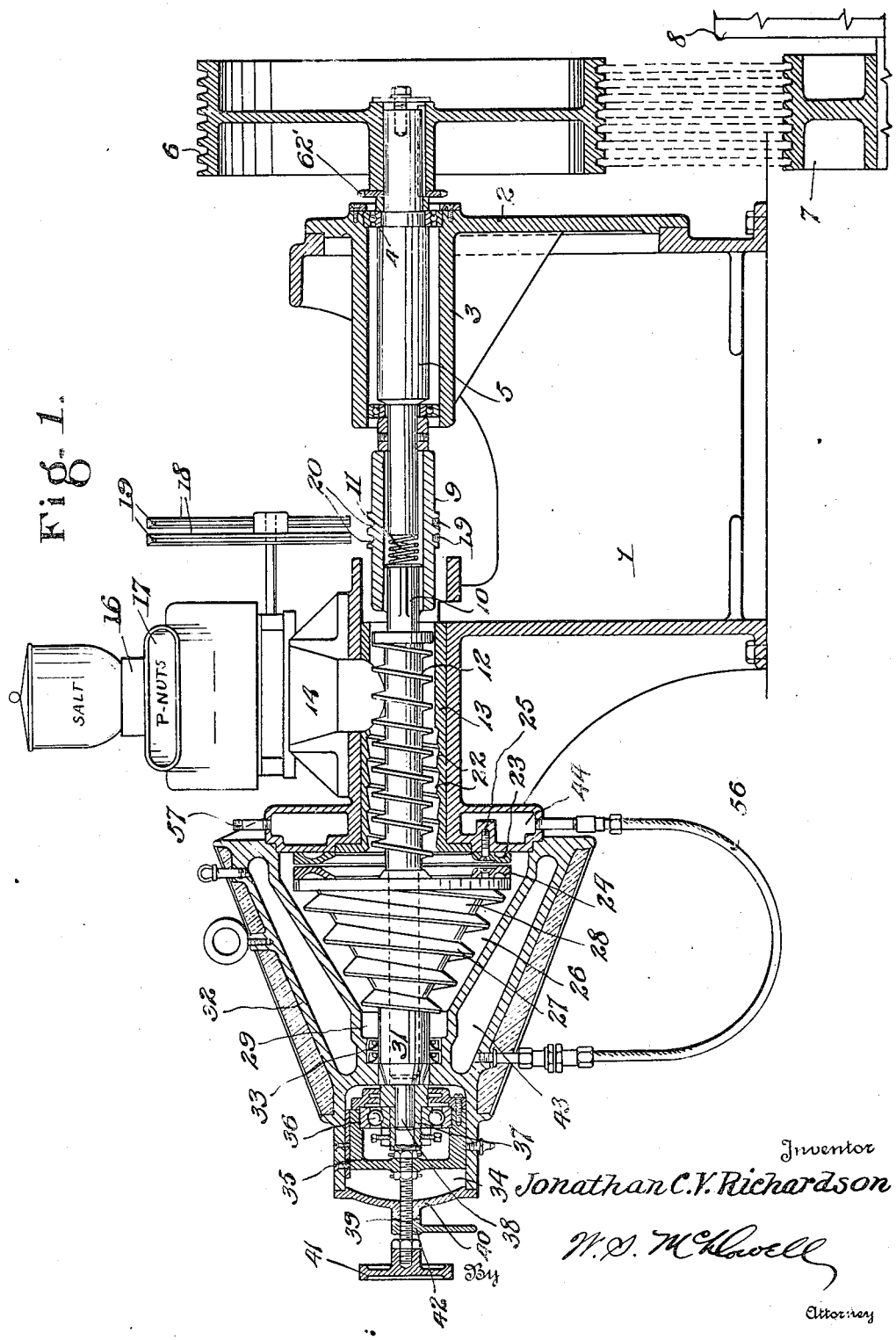

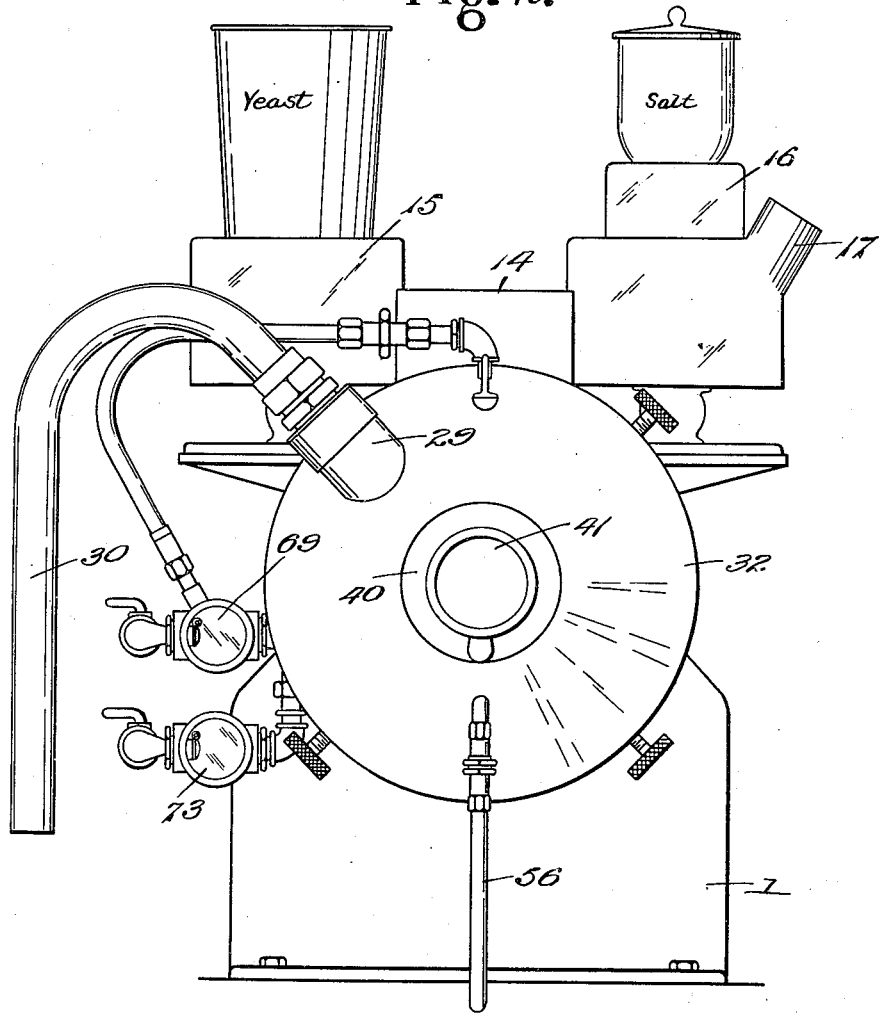

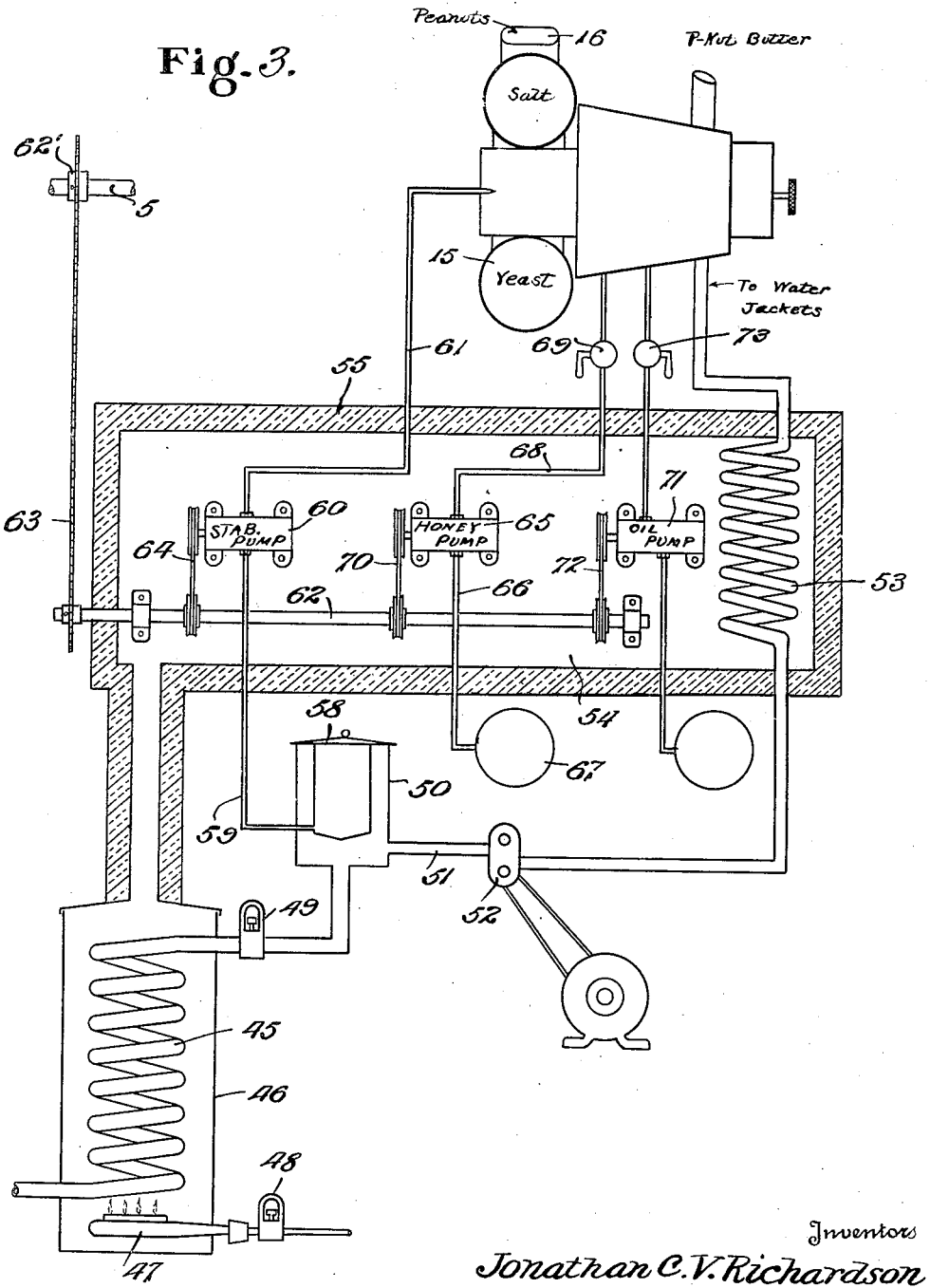

2,389,816

UNITED STATES PATENT OFFICE 2,389,816

NUT GRINDING MACHINE

Jonathan C. V. Richardson, Columbus, Ohio

Application October 14, 1942, Serial No. 461,934

2 Claims. (Cl. 241—43)

This invention relates to an improved machine for grinding edible nuts either alone or conjointly with other food products to produce edible compounds of butter-like consistency.

Peanut butter prepared by grinding the kernels of roasted peanuts is a decidedly stiff semi-solid mass and, while highly nutritious, it is objectionable to many users because of its dryness and tendency to adhere to the mouth when being eaten. Again, because of its stiffness, it is often too difficult to properly spread on bread or other bakery products. To increase its ability to spread and to overcome its excessively dry taste, it is customary to add certain edible oils in regulated quantities to the ground peanuts prior to packing the same. It has been found that when sufficient additional oils are admixed with the ground nuts to produce the desired plasticity to provide for smooth and convenient application of the butter to baked products and to overcome the cloying action thereof, the added oil content of the mixture is so high that the product, on standing, or during shipment and storage, causes the oils contained therein to separate in part from the more solid products of the body. This is objectionable to the users of such products since the oil separation set forth is ordinarily of such a nature as to require the user to re-work the separated oil into the body of the product or remove it completely therefrom.

Besides adding edible oils to peanut butter to increase the plasticity thereof, it is also common to add various other nutrition-developing and flavoring compounds. Highly nutritious food preparation of this nature consists in adding dry brewer's yeast to ground peanut butter at the time the latter is being reduced. In other compounds, bee honey is often added as a flavoring or sweetening agent. In all these forms, it is a difficult matter to uniformly and thoroughly blend the addition agents with the ground nuts so as to produce a smooth, palatable well-blended composition in which the addition agents do not separate from the nut butter to cause stratification and further to obtain a composition which is pleasant to the sense of taste.

Accordingly, it is a primary object of the present invention to provide an improved machine for grinding nut butter in which various addition agents are incorporated and wherein the construction and operation of the machine is such as to cause the nut butter composition reduced thereby to become thoroughly homogenized and rendered uniform in composition throughout its mass, to the end that the composition will be highly nutritious, palatable and stable in its reduced form.

In the attainment of this end, means are provided for heating the nuts and the various addition agents admixed therewith while the same are undergoing reduction in size by the operation of the grinding instrumentalities. Hitherto, peanut grinding mills have been operated at room temperatures, except for the heat developed by the grinding operations per se, and it has been found that greatly improved results are obtainable by applying artificially supplied heat thereto during the grinding and homogenizing operations, particularly when the heat so applied is maintained at an optimum and uniform value.

Other objects of the invention reside in the provision of a nut grinding mill for producing nut butter compositions, wherein the casing of the mill is provided with communicating passages or jackets adapted for the reception and circulation of a fluid heat carrier and by which the desired operating temperatures of the mill are secured and uniformly maintained; in the provision of feeding means, synchronized with the operation of the mill, for introducing in regulated and accurately proportioned amounts various addition agents to the nut kernels, and in other features and advantages hereinafter detailed.

In the accompanying drawings:

Fig. 1 is a vertical sectional view taken through a nut grinding mill formed in accordance with the present invention;

Fig. 2 is a front elevational view thereof;

Fig. 3 is a diagrammatic view illustrating the water circulating and pumping mechanism employed by the mill.

Referring more particularly to the drawings, the numeral 1 designates the base frame of the mill. Secured to this frame at one end thereof is a bearing plate 2, the latter being formed with a tubular bearing extension 3. Within this extension, there is supported a pair of anti-friction bearings 4 which receive for rotation a horizontally journaled shaft 5. One end of this shaft carries a grooved belt wheel 6 adapted for the reception of a plurality of parallel endless V-belts, not shown, which are also trained over a corresponding wheel 7 connected with the armature shaft of an electric drive motor 8.

The end of the shaft 5 opposed to the wheel 6 is splined in a sleeve-type coupling 9, said coupling also receiving the similarly splined end of a conveyor shaft 10, the latter being longitudinally aligned with the shaft 5 and rotatably driven by the latter through the coupling 9, a coil spring 11 being interposed between the adjacent ends of the shafts 5 and 10. The shaft 10 has formed therewith spirally disposed, material advancing conveyor blades 12, the latter being arranged within a material-conveying tube 13 mounted horizontally in the base frame 1. Communicating with the interior of the tube 13 is a centrally disposed feeding spout 14 which communicates on opposite sides thereof with a yeast feeder, shown at 15, and with a combined salt and peanut feeder 16. The latter has a peanut inlet 17 which is adapted to be united by sheet metal piping with an overhead storage bin or magazine in which roasted peanut kernels are contained. The feeders 15 and 16 may be provided with internally disposed agitators for causing positive and regulated outflow of the materials handled thereby into the open ended spout 14. These agitators may be driven by means of belt wheels shown at 18 and the belts 19 which pass over these wheels are likewise received in corresponding annular grooves 20 provided in the outer walls of the coupling 9, thereby enabling the material agitators to be positively driven.

By these means, proportionate amounts of peanut kernels and salt may be introduced into the horizontally and longitudinally extending conveyor chamber 21 provided by the tube 13. Also, if desired, dried brewer's yeast may likewise be introduced into the chamber 21 through the operation of the feeder 15 when a yeasted peanut butter is to be produced.

In advance of the spout 14, the internal walls of the chamber 21 are spirally shouldered, as at 22, for the purpose of cooperating with the blades 12 of the conveyor shaft 10, causing the positive and forward advance of such materials toward the grinding instrumentalities at the outlet end of the chamber 21. Such grinding instrumentalities may comprise stationary and rotatable disks 23 and 24 respectively. The stationary disk is secured, as at 25, to the base frame 1, while the rotatable disk 24 is mounted so as to rotate in unison with the shaft 10. The grinding disks are adjustably spaced with respect to each other and have their immediate opposed surfaces provided with the usual grinding ribs. Materials discharged from the chamber 21 drop between these opposed grinding disks and are reduced thereby to the required degree of sub-division. When the ground materials are discharged from the peripheral edges of the disks 23 and 24, the same are deposited in a homogenizing chamber 26 and are churned and intimately admixed in this chamber by the provision of spiral blades 27 provided on a conical head 28. The chamber 26 is formed in a jacketed casing 32 which is removably carried by the base frame 1. The blades 27 also serve to advance the ground materials through the homogenizing chamber. The smaller end of this chamber is connected with a material outlet 20 which, as shown in Fig. 2, is joined with a downwardly extending discharge tube 30. The outlet 29 is formed in the casing 32. Bottles or other containers, not shown, are adapted to be positioned immediately below the discharge end of the tube 30 in order to be filled with the ground product.

The head 28 is fixed to the shaft 10 in order to rotate in unison with the latter and with the disk 24. To control the spacing between the grinding disks, the outer end of the head 28 terminates in a bearing extension 31 which is engaged by packing rings 33 carried by the casing 32. The outer end of said casing is formed with a pocket 34 in which is slidably and non-rotatably mounted a follower 35. The latter receives an antifriction bearing 36 through which passes a headed thimble 37 positioned on a short stud extension 38 formed with the outer end of the head 28. The follower is equipped with an adjusting screw 39, the threaded shank of which is received within a correspondingly threaded bore provided axially in a cover plate 40 arranged at the outer end of the casing 32. The outer end of the screw 39 is equipped with a manipulating wheel 41 and a lock nut 42. By rotating the screw 39, the follower 35 may be reciprocated within the pocket 34, thereby imparting corresponding movement to the head 28 and its associated shaft 10, so that the spacing between the grinding disks 23 and 24 may be regulated and maintained.

One of the outstanding features of this machine is the provision of a water jacket 43 in the casing 32 and of a communicating jacket 44, the latter being formed in the base frame 1 immediately contiguous to the stationary grinding disk 23. A suitable heating fluid, such for example as hot water, is circulated through the jackets 43 and 44 so that heat is transmitted through the inner walls of these jackets to the products undergoing grinding and homogenizing in the machine.

Preferably, the temperature of the fluid heating medium should be such that the products within the grinding and homogenizing portions of the machine will, through heat transference, be maintained at a temperature of the order of 180° to 190° F. The material handled by the mill passes rapidly through the grinding and homogenizing sections so that the vitamin values contained therein are not detrimentally affected by the heating operation. By carefully regulating the temperature of the fluid heating medium, as by automatic thermostatic regulation, uniform temperatures are maintained within the grinding and homogenizing portions of the mill. If for any reason the mill should develop, during the grinding operation, excessive temperatures, that is temperatures above 190° F., the heating fluid passing through the jackets 43 and 44 tends to extract and dissipate such abnormally high temperatures so that the products undergoing treatment are maintained at uniform temperatures of the order of 180° to 190° F., as has been set forth in my prior copending application, Serial No. 266,210, filed April 5, 1939, now Patent No. 2,307,574, dated November 17, 1942, and which is directed to certain method steps involved in the operation of machines of this category.

To effect the circulation of hot water or other heated fluid through the jackets 43 and 44, water may be delivered to a heating coil 45 which is arranged within a casing 46, the bottom of the latter containing a gas burner 47 governed by the operation of a thermostatic valve 48. The outlet end of the coil 45 is provided with a temperature regulating thermostat 49 and leads to a stabilizer tank 50. From the tank 50, the heated water is passed by way of a pipe line 51 containing a motor driven pump 52 and led through a coil 53 arranged within a pump chamber 54 provided in a housing 55 having insulated walls, heat transference through the walls of the coil 53 serving, at least in part, to heat the chamber 54. From the coil 53, the hot water is then passed to the water circulating jacket 43 provided in the casing 32. After passing through the jacket 43, the hot water is passed by way of the hose connection 56, shown in Fig. 1, to the base frame jacket 44. A water outlet or return 57 leads from the jacket 44 to the inlet side of the coil 45 for recirculation through the system, or the outlet 57 may lead to an accumulator tank, not shown, in which a constant water level is maintained. By these means, the temperature of the products undergoing reduction and homogenization in the mill may be maintained within close limits.

In addition to producing a yeast compounded peanut butter, various other products may be added, such as a hydrogenated stabilizing oil, bee honey, or a clear peanut oil. A stabilizing agent composed of a hydrogenated peanut oil with a melting point as high as 140° F. may be used. Such a stabilizing agent, because of its relatively high melting point, is contained within a vessel 58 which is submerged in the tank 50. A pipe line 59 extends from the vessel 58 to a pump 60 and leading from the discharge side of this pump is a pipe line 61 which extends to the feeding spout 14 of the mill. It is preferable to coat the peanut kernels with the stabilizing agent prior to milling the same, as the milling operation is thereby expedited and the ground nut particles are uniformly coated and admixed with the stabilizing agent. By locating the vessel 58 containing the stabilizing agent in the hot water tank 50, the stabilizing agent is maintained at a temperature so that it may be readily handled by the pump 60 and delivered to the spout 14 in liquid form.

The pump 60 is located within the chamber 54 of the housing 55. Within this housing, there is provided a rotatably supported pump operating shaft 62, the latter being driven by the chain and sprocket motion-transmitting means 63 which, in turn, is driven by the sprocket 62'. A belt drive 64 extends from the shaft 62 to the operating shaft of the pump 60. By removing the belt of the drive 64, the operation of the pump 60 may be discontinued whenever desired.

Also, there may be arranged within the chamber 54 a second pump 65. The inlet side of this pump may be connected by a pipe line 66 with a tank 67 containing bee honey, or other equivalent sweetening or flavoring agent. The discharge side of the pump 65 is joined with a pipe line 68 which extends to a valved sight feed device 69 and thence into the interior of the homogenizing chamber 26. The pump 65 may be driven by the shaft 62 through a belt drive 70.

A third pump 71 has been shown as being mounted within the chamber 54 and as being driven by the shaft 62 through a belt drive 72. The inlet of the pump 71 is connected with a source of oil supply which may be, for example, a light normally liquid peanut oil. The discharge side of the pump 71 extends to a second valved sight feed device 73 and from the latter to the homogenizing chamber 26, where the oil is directly introduced into the ground peanut mixture after the latter has passed through the milling disks 22 and 23. The pumps within the chamber 54 may be selectively operated, may be operated simultaneously in a group of two or more, or may be removed from operation altogether, depending upon the desired composition of the nut butter discharged from the machine. In this regard, the machine is flexible in its ability to produce various compositions. Thus, ordinary peanut butter may be produced to which is added nothing more than but a limited quantity of table salt. Another saleable product is an oil fortified peanut butter, in which additional quantities of peanut oil are added. A third product consists in peanut butter having a stabilizing agent added thereto and a fourth product consists in the addition of brewer's yeast to peanut butter, with or without the addition of the fortifying oils, or, again, any one of these products may have added thereto bee honey as a sweetening or flavoring constituent. By heating these compositions while the same are undergoing milling and/or homogenization and maintaining the same at temperatures of the order of 180° to 190° F., the ground products are characterized by their uniform composition, pleasant taste and freedom from stratification. One of the outstanding advances which my machine has made in the art is in the production of peanut butter compounded with 20% by weight of brewer's yeast wherein the blended product is entirely palatable and pleasant to the taste of most persons. In prior preparations of this character, the yeast has been so predominant, as to be distasteful to many users thereof. By grinding and homogenizing the preparation with the use of heat as herein described, the yeast is so thoroughly incorporated in and blended with the ground peanut kernels that the presence of the yeast from the standpoint of taste can hardly be detected. If desired, the stabilizing agent may be directly introduced into the feed spout 14 in its solid form, without being heated and pumped therein, as previously described.

What I claim is:

1. Apparatus for producing nut butter compositions comprising a casing formed with axially aligned conveyor, grinding and homogenizing chambers, said conveyor chamber being formed with a material inlet, a worm-type conveyor rotatably mounted in said conveyor chamber, a stationary grinding plate mounted in said grinding chamber, a complemental opposed grinding plate rotatable with said conveyor, a spirally bladed substantially conical homogenizer positioned in said homogenizing chamber beyond said grinding plates and mounted for axial rotation in unison with said conveyor and movable grinding plate, and an outlet for reduced material communicating with one end of said homogenizing chamber.

2. Apparatus for producing nut butter compositions comprising a casing formed with axially aligned conveyor, grinding and homogenizing chambers, said conveyor chamber being formed with a material inlet, a worm-type conveyor rotatably mounted in said conveyor chamber, a stationary grinding plate mounted in said grinding chamber, a complemental opposed grinding plate rotatable with said conveyor, a spirally bladed substantially conical homogenizer positioned in said homogenizing chamber beyond said grinding plates and mounted for axial rotation in unison with said conveyor and movable grinding plate, an outlet for reduced material communicating with one end of said homogenizing chamber, and jackets surrounding said grinding and homogenizing chambers for the circulation of a fluid heat-transferring medium.

JONATHAN C. V. RICHARDSON.